(12) United States Patent
Kim

(10) Patent No.: US 11,455,057 B2
(45) Date of Patent: Sep. 27, 2022

(54) TOUCH SCREEN INCLUDING P-TYPE TRANSISTOR AND APPLIED WITH PROGRAMMABLE VOLTAGE

(71) Applicant: G2TOUCH Co., LTD., Seongnam (KR)

(72) Inventor: Hyung Guel Kim, Seongnam (KR)

(73) Assignee: G2TOUCH Co., LTD., Seongnam (KR)

( * ) Notice: Subject to any disclaimer, the term of this patent is extended or adjusted under 35 U.S.C. 154(b) by 0 days.

(21) Appl. No.: 17/338,344

(22) Filed: Jun. 3, 2021

(65) Prior Publication Data

US 2022/0179537 A1    Jun. 9, 2022

(30) Foreign Application Priority Data

Dec. 3, 2020 (KR) ........................ 10-2020-0167444

(51) Int. Cl.
*G06F 3/041*    (2006.01)
*G06F 3/044*    (2006.01)

(52) U.S. Cl.
CPC ........ *G06F 3/04164* (2019.05); *G06F 3/0446* (2019.05)

(58) Field of Classification Search
CPC ... G06F 3/04164; G06F 3/0446; G06F 3/0443
See application file for complete search history.

(56) References Cited

U.S. PATENT DOCUMENTS

| | | | | |
|---|---|---|---|---|
| 9,507,467 B2 * | 11/2016 | Lee | .......................... | G06F 3/045 |
| 9,772,733 B2 * | 9/2017 | Lee | ..................... | G06F 3/04166 |
| 9,904,388 B2 * | 2/2018 | Lee | ........................ | G06F 3/0412 |
| 9,958,995 B2 * | 5/2018 | Jin | .......................... | G06F 3/044 |
| 10,318,087 B2 * | 6/2019 | Jin | ...................... | G06F 3/04164 |
| 10,983,620 B2 * | 4/2021 | Liang | ..................... | G06F 3/0412 |
| 2004/0095159 A1 * | 5/2004 | Kimura | ............. | H03K 19/01728 326/33 |
| 2013/0335376 A1 * | 12/2013 | Lee | ........................ | G06F 3/0446 345/174 |
| 2014/0132534 A1 * | 5/2014 | Kim | ....................... | G06F 3/0416 345/173 |
| 2015/0116261 A1 * | 4/2015 | Ahn | ....................... | G06F 3/0443 345/174 |
| 2015/0116263 A1 * | 4/2015 | Kim | ....................... | G06F 3/0443 345/174 |

(Continued)

FOREIGN PATENT DOCUMENTS

| | | |
|---|---|---|
| KR | 10-2016-0094541 A | 8/2016 |
| KR | 10-2017-0081092 A | 7/2017 |
| KR | 10-2018-0134089 A | 12/2018 |

*Primary Examiner* — Amy Onyekaba

(57) ABSTRACT

An object of the present invention is to efficiently reduce the number of signal lines of a control port and an input port of a sensor switch required for controlling a touch by supplying a programmable voltage from a touch drive IC TDI, not a separate external voltage source, as a voltage applied to a touch sensor. The present invention provides a touch screen which is capable of implementing low power consumption, low-resistance signal wiring, touch IC price reduction, and the like by forming a switching transistor of the sensor switch only with a P-type transistor manufactured in a Low Temperature Poly Silicon (LTPS) process, and driving the switching transistor without using a negative voltage (−V).

16 Claims, 14 Drawing Sheets

(56) References Cited

U.S. PATENT DOCUMENTS

| | | | |
|---|---|---|---|
| 2016/0098141 A1* | 4/2016 | Kang | G06F 1/3265 |
| | | | 345/174 |
| 2016/0170529 A1* | 6/2016 | Lee | G06F 3/044 |
| | | | 345/174 |
| 2016/0246409 A1* | 8/2016 | Yang | G09G 3/3233 |
| 2016/0291711 A1* | 10/2016 | Jin | G06F 3/044 |
| 2017/0097703 A1* | 4/2017 | Lee | G06F 3/0443 |
| 2017/0168650 A1* | 6/2017 | Lee | G06F 3/0412 |
| 2018/0074613 A1* | 3/2018 | Lee | H03K 17/962 |
| 2018/0074642 A1* | 3/2018 | Lv | G09G 3/3655 |
| 2018/0173342 A1* | 6/2018 | Lee | G06F 3/0418 |
| 2018/0175117 A1* | 6/2018 | Lee | H01L 27/323 |
| 2018/0217701 A1* | 8/2018 | Jin | G06F 3/04166 |
| 2018/0329546 A1* | 11/2018 | Qian | G06F 3/04184 |
| 2020/0118475 A1* | 4/2020 | Jang | G09G 3/20 |
| 2020/0192544 A1* | 6/2020 | Chung | G09G 3/3413 |
| 2021/0019034 A1* | 1/2021 | Kim | G06F 3/04166 |
| 2022/0158630 A1* | 5/2022 | Okabe | H03K 5/13 |

\* cited by examiner (b1)

| Input | | Output | | Description |
|---|---|---|---|---|
| S1 | G13 | P11 | Sensor | |
| 0 | 0 | X | X | Don't |
| 0 | 1 | SIN1 | SIN1 | Sensing |
| 1 | 0 | X | GD1 | Driving |
| 1 | 1 | X | X | NOP |

0 : Low(-10)Voltage

1 : High(+10)Voltage (b2)

(a1)

(a2)

Denate:
    0: Low(0 V) Voltage
    1: High(+ V) Voltage
    X: Don't Care
    Hi-Z: High Impedence TSB: Tri-State Buffer
    Vdrv: Driving Voltage(0 ~ +10V)
    Vsens: Voltage On Sensors
RV-Charge: Reverse charge

TOUCH SCREEN INCLUDING P-TYPE TRANSISTOR AND APPLIED WITH PROGRAMMABLE VOLTAGE

CROSS-REFERENCE TO RELATED APPLICATIONS

This application claims priority to and the benefit of Korean Patent Application No. 10-2020-0167444 filed in the Korean Intellectual Property Office on Dec. 3, 2020, the entire contents of which are incorporated herein by reference.

TECHNICAL FIELD

The present invention relates to a touch screen, and more particularly, to a touch screen which includes a P-type transistor and to which a programmable voltage is applied.

BACKGROUND ART

In general, a touch screen is applicable to various types of electronic devices, such as a navigation device, a netbook computer, a notebook computer, a tablet PC, a Digital Information Device (DID), and an Internet Protocol TV (IPTV), as well as mobile devices, such as a smart phone, a Personal Digital Assistant (PDA), and a Portable Multimedia Player (PMP).

The touch screen may be externally mounted onto upper plates of various types of display, such as a Liquid Crystal Display (LCD), a Plasma Display Panel (PDP), and an Organic Light Emitting Diode (OLED) displays divided into a rigid type, a flexible type, and a foldable type, or may be integrally mounted into the display.

The display to which the touch screen is applied may be variously divided into an add-on type display, an on-cell type display, an in-cell type display, and the like.

Various types of touch methods, for example, a resistive film method, a capacitive method, an electromagnetic induction method, an infrared method, or an ultrasonic method, may be applied to the touch screen.

The touch screen to which the capacitive method is applied may detect whether a touch is input and a touch location based on a change in a voltage by touch capacitance (Ct) generated in a touch sensor according to a contact or an approach of a touch input tool, for example, a finger or an electronic pen, to the touch sensor arranged in the touch screen.

FIG. 1 is a diagram illustrating an example of a configuration of a touch screen provided with a MUX.

Referring to FIG. 1, the touch screen 100 may include a plurality of touch sensors 110, a plurality of sensor signal lines 120, a plurality of MUXs 130, a touch drive IC 140, and the like.

The touch sensor 110 may be arranged, for example, in a matrix form including a plurality of rows and columns, and the sensor signal lines 120 may be independently connected to the touch sensors 110, respectively.

The sensor signal lines 120 may transmit touch capacitance Ct generated by the touch sensor 110 to the touch drive IC 140 through the MUX 130, and may be arranged at one side (for example, the right side) of the touch sensors belonging to each column side by side as illustrated in FIG. 1.

The plurality of MUXs 130 may implement a switching function of controlling the large amount of inputs and outputs, be formed of the same Thin Film Transistor (TFT) as the TFT used in driving pixels of the display, and may be disposed outside the touch drive IC 140. For example, the touch drive IC 140 may be disposed on a flexible circuit board, such as a Chip On Film (COF) or a Flexible Printed Circuit (FPC), and the plurality of MUXs 130 may be disposed on a Touch Screen Panel (TSP) that is a separate from the flexible circuit board.

The plurality of MUXs 130 may be connected to the sensor signal lines of the touch sensors belonging to each column, and may select any one sensor signal line among the sensor signal lines and connect the selected sensor signal line to the touch drive IC 140.

For example, as illustrated in FIG. 1, a first MUX 1 may be connected with four sensor signals lines connected to the touch sensors of first to fourth rows Rows 1 to 4 belonging to a first column Col 1 and select any one of the sensor signal lines and connect the selected sensor signal line to the touch drive IC 140.

The touch drive IC 140 may detect whether a touch is input and a touch location by driving the touch sensors, and receiving the touch capacitance Ct generated by the touch sensors through the sensor signal line 120 and the MUX 130.

The plurality of MUXs 130 is disposed on a touch screen panel TSP, thereby efficiently reducing the number of input ports of the touch drive IC 140. For example, as illustrated in FIG. 1, in the case where the number of touch sensors 110 is 32 and the number of MUXs 130 is 8, the number of input ports of the touch drive IC 140 may be 8 which corresponds to the number of MUXs 130.

The more particular technology related to the touch screen provided with the MUX is already described in detail in Korean Patent Application No. 10-2016-0113599 filed by the applicant of the present application, so that the description thereof will be omitted below.

SUMMARY OF THE INVENTION

The present invention has been made in an effort to provide a touch screen which implements low-voltage switching by configuring a switching transistor of a sensor switch, which is formed in a touch sensor and controls a sensing voltage applied to a touch IC and driving voltages applied to sensors from the touch IC, only with a P-type transistor manufactured with a Low Temperature Poly Silicon (LTPS) process, thereby implementing low power consumption, decrease in a touch IC size, and the like.

A touch screen according to an exemplary embodiment of the present invention includes: a plurality of touch sensors which is maintainable in a sensing state and a driving state; a plurality of sensor switches which includes a first P-type transistor, a first capacitor that connect a gate and a source of the first transistor, a second P-type transistor and a second capacitor that connects a gate and a source of the second transistor, and independently controls a state of each of the touch sensors; a plurality of MUXs which groups the touch sensors into a plurality of groups and blocks each group into a plurality of blocks to control the touch sensors in a unit of a block; and a touch drive IC which detects a touch based on touch capacitance generated by at least one or more touch sensors in the sensing state, or provides a voltage applied to the plurality of touch sensors in the driving state.

The voltage applied to the sensor switch may be simply a positive voltage, and the positive voltage may include zero voltage.

In the sensing state, the first capacitor may be charged, the first transistor may be turned on, and a voltage of the touch capacitance may be output to the touch drive IC through the MUX, and in the driving state, the second capacitor may be charged, the second transistor may be turned on, and a predetermined DC voltage or a ground (GND) voltage may be applied to the touch sensor from the touch drive IC.

The touch drive IC may include two tri-state buffers for controlling turn on or turn off of the first transistor or the second transistor, and charge and reverse charge of the first capacitor or the second capacitor.

An output of each of the tri-state buffers may be any one of a HIGH/LOW DC voltage and a Hi-z (Tri-state) voltage.

Each of the tri-state buffers may include a Zener diode, and prevent electric shock of the tri-state buffer and control charge and reverse charge of the first capacitor and the second capacitor.

A break down voltage of the Zener diode may be determined in proportion to the voltage applied to the sensor switch.

The driving state may be divided into two or more sub states according to the voltage applied from the touch drive IC to the touch sensor, and the voltage applied to the touch sensor in the driving state may be a voltage programmable by the touch drive IC.

In each of the sub states, the voltage applied to the touch sensor may be different and may be any one of a HIGH/LOW DC voltage and a Hi-z (Tri-state) voltage.

Control signals of the sensor switch and the MUX may be generated from the touch drive IC, and a driving voltage of the sensor switch may be a DC voltage between a high level (+V) and a low level (+0 V).

The number of groups may correspond to the number of MUXs, and the number of blocks in each group may correspond to the number of input ports of each MUX.

The sensor switches and the MUXs may be disposed on a touch screen panel on which the touch sensors are arranged.

The sensor switch may include a first port for connecting a touch sensor connected to the sensor switch to the MUX, and a second port for applying a voltage in the driving state.

The touch drive IC may interlock a switch control signal for controlling the sensor switches and a MUX control signal for controlling the MUXs to perform a touch detection scanning operation in the unit of the block.

The MUX control signal may be identically applied to each MUX, and the switch control signal may be identically applied to each block.

The touch drive IC may apply different switch control signals to the sensor switches in each block while performing the touch detection scanning operation in the unit of the block.

According to the exemplary embodiment of the present invention, it is possible to improve performance of touch detection, efficiently reduce the number of control signal lines for controlling the MUX and the sensor switch, and implement the driving of the touch drive IC (TDI) with low power consumption.

According to the exemplary embodiment of the present invention, it is possible to provide various types of fixed voltages (for example, HIGH/LOW DC voltage, square wave, and Hi-z (Tri-state)), and it is possible to implement a touch screen with high efficiency by supplying a fast switching signal to the sensor switch SW.

According to the exemplary embodiment of the present invention, it is easy to convert a state for line sensing and frame sensing.

According to the exemplary embodiment of the present invention, a low voltage is used as a manufacturing processing voltage of the touch IC, so that power consumption is reduced and a price of the IC itself is lowered.

DETAILED DESCRIPTION

Hereinafter, an exemplary embodiment of the present invention will be described in detail with reference to the accompanying drawings and the exemplary embodiment.

An exemplary embodiment of the present invention relates to a touch screen provided with a MUX and a sensor switch, and for example, in a touch screen in which a plurality of MUXs is disposed outside a touch drive IC TDI, it is possible to efficiently reduce the number of MUXs and the number of input ports of each MUX, improve performance of touch detection, and efficiently reduce the number of control signal lines for controlling the MUX and the sensor switch.

According to another exemplary embodiment of the present invention, in order to additionally reduce the number of signal lines of a control port and an input port of a sensor switch, a voltage, which is applied to a touch sensor from a separate external voltage source in the related art, is directly supplied from a touch drive IC TDI, so that it is possible to efficiently reduce the number of signal lines of a control port and an input port of a sensor switch required for controlling a touch.

In the exemplary embodiment of the present invention, the sensor switch may be formed with only a P-type transistor, and a range of a driving voltage of the touch drive IC TDI may be decreased to a positive voltage (GND to +V) to reduce power consumption, and a size of the touch drive IC TDI may be decreased.

Figure 2:
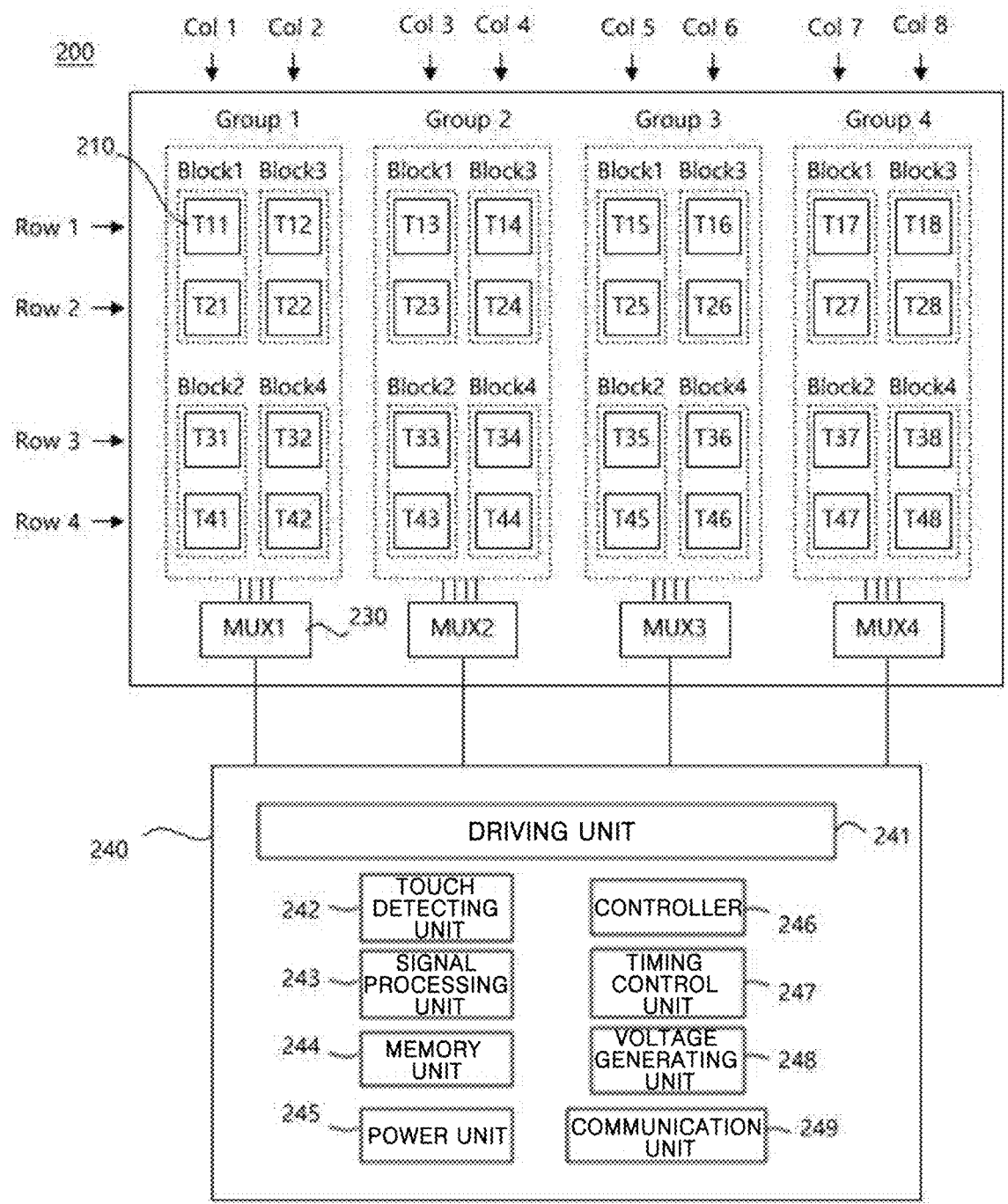
FIG. 2 is a diagram illustrating an example of a configuration of a touch screen provided with a MUX and a sensor switch according to an exemplary embodiment of the present invention.

FIG. 2 is a diagram illustrating an example of a configuration of a touch screen provided with a MUX and a sensor switch according to an exemplary embodiment of the present invention.

Referring to FIG. 2, the touch screen 200 may include a plurality of touch sensors 210, a plurality of sensor signal lines (not illustrated), a plurality of MUXs 230, a plurality of sensor switches (not illustrated), and a touch drive IC 240, and the like.

The touch sensors 210 may be arranged in a form of, for example, a matrix including a plurality of rows and columns, and may have a shape of a rectangle, a rhombus, or a unique shape in which multiple rhombuses are connected.

The touch sensor 210 may be formed of, for example, a conductive transparent material (for example, Indium Tin Oxide (ITO)), or a conductive opaque material (for example, metal), and may be variously referred to by any other name, such as a touch pad, a touch pattern, or a sensor pattern.

The sensor signal lines may be independently connected to the touch sensors 210, respectively, and may transmit touch capacitance Ct generated by the touch sensor 210 to the touch drive IC 240 through the sensor switch and the MUX 230.

The sensor signal line may be formed of, for example, a conductive transparent material (for example, ITO), or a conductive opaque material (for example, metal), and may be variously referred to by any other name, such as a sensor trace or a link line.

The plurality of MUXs 230 may be disposed outside the touch drive IC 240. For example, the touch drive IC 240 may be disposed on a flexible circuit board, such as a Chip On Film (COF) or a Flexible Printed Circuit (FPC), and the plurality of MUXs 230 may be disposed on a Touch Screen Panel (TSP) that is separate from the flexible circuit board or displayed on a display to which the touch screen is applied.

The touch drive IC 240 controls a switching operation of the MUX 230 and the sensor switch by interlocking the MUX 230 and the sensor switch with each other, and drives the touch sensors 210, receives the touch capacitance Ct generated by the touch sensors through the MUXs 230 and the sensor switches to detect whether a touch is input and the touch location, and may be variously referred to by any other name, such as a touch IC.

The touch drive IC 240 may be interlocked with a Display Drive IC (DDI) included in various types of displays, such as an LCD or an OLED or may be integrated with the DDI to be manufactured as one IC, for example, a Touch Display Drive IC (TDDI), and may be interlocked with a CPU, a MCU, or the like included in various types of electronic devices, such as a smart phone or an inspection device.

For example, as illustrated in FIG. 2, the touch drive IC 240 may include all or some of a driving unit 241 for driving a touch, a touch detecting unit 242 for detecting a touch, a signal processing unit 243 for processing a touch signal, a memory unit 244 for storing touch data, a power unit 245 for supplying power, a controller 246 for controlling touch driving and detection, a timing control unit 247 for controlling a touch timing, a voltage generating unit 248 for generating a touch driving voltage, and a communication unit 249 for communicating with the outside.

The controller 246 may include at least one or more of the touch detecting unit 242, the signal processing unit 243, and the timing control unit 247, and may control one or more of the constituent elements and perform interfacing with external constituent elements through the communication unit 249. As the memory unit 244, for example, a line memory or a frame memory may be used.

According to the exemplary embodiment of the present invention, the plurality of MUXs 230 may be disposed on a touch screen panel TSP or may be displayed on the display to which the touch screen is applied, and for example, one MUX is disposed so as to correspond to one or more columns to reduce the number of MUXs and reduce the number of input ports of the touch drive IC.

Hereinafter, the present invention will be described in detail with reference to the exemplary embodiment illustrated in FIG. 2 in which the plurality of touch sensors is arranged in a matrix form including first to fourth rows ROWs 1 to 4 and first to eighth columns Cols 1 to 8.

For example, as illustrated in FIG. 2, among a total of 32 touch sensors arranged in four rows and eight columns, the touch sensors of first and second columns Col 1 and Col 2 may be classified into a first group Group1, the touch sensors of third and fourth columns Col 3 and Col 4 may be classified into a second group Group2, the touch sensors of fifth and sixth columns Col 5 and Col 6 may be classified into a third group Group3, and the touch sensors of seventh and eighth columns Col 7 and Col 8 may be classified into a fourth group Group4.

Herein, one group may correspond to one MUX. For example, when two columns are classified into one group among the total of eight columns, the number of MUXs may be four, and for example, when four columns are classified into one group among the total of eight columns, the number of MUXs may be two. The number of columns classified into each group may be arbitrarily changed according to, for example, various touch detecting methods.

In the exemplary embodiment of the present invention, for example, the present invention will be described in detail based on a touch detecting method in which a scanning operation is performed in the row direction for the touch detection, and the scanning is sequentially performed by separating the odd field (or odd column) and the even field (or even column) as an example.

The touch sensors in each group may be classified into a plurality of blocks. For example, as illustrated in FIG. 2, among the eight touch sensors in the first group Group1, first and second touch sensors T11 and T21 of the first column may be classified into a first block Block1, third and fourth touch sensors T31 and T41 of the first column may be classified into a second block Block2, first and second touch sensors T12 and T22 of the second column may be classified into a third block Block3, and third and fourth touch sensors T32 and T42 of the second column may be classified into a fourth block Block4.

Herein, the number of blocks in each group may correspond to the number of input ports of each MUX. For example, when the first group is classified into four blocks, the number of input ports of the first MUX may be four, and when the first group is classified into two blocks, the number of input ports of the first MUX may be two. The number of blocks in each group may be arbitrarily changed according to, for example, various touch detecting methods.

Figure 3:
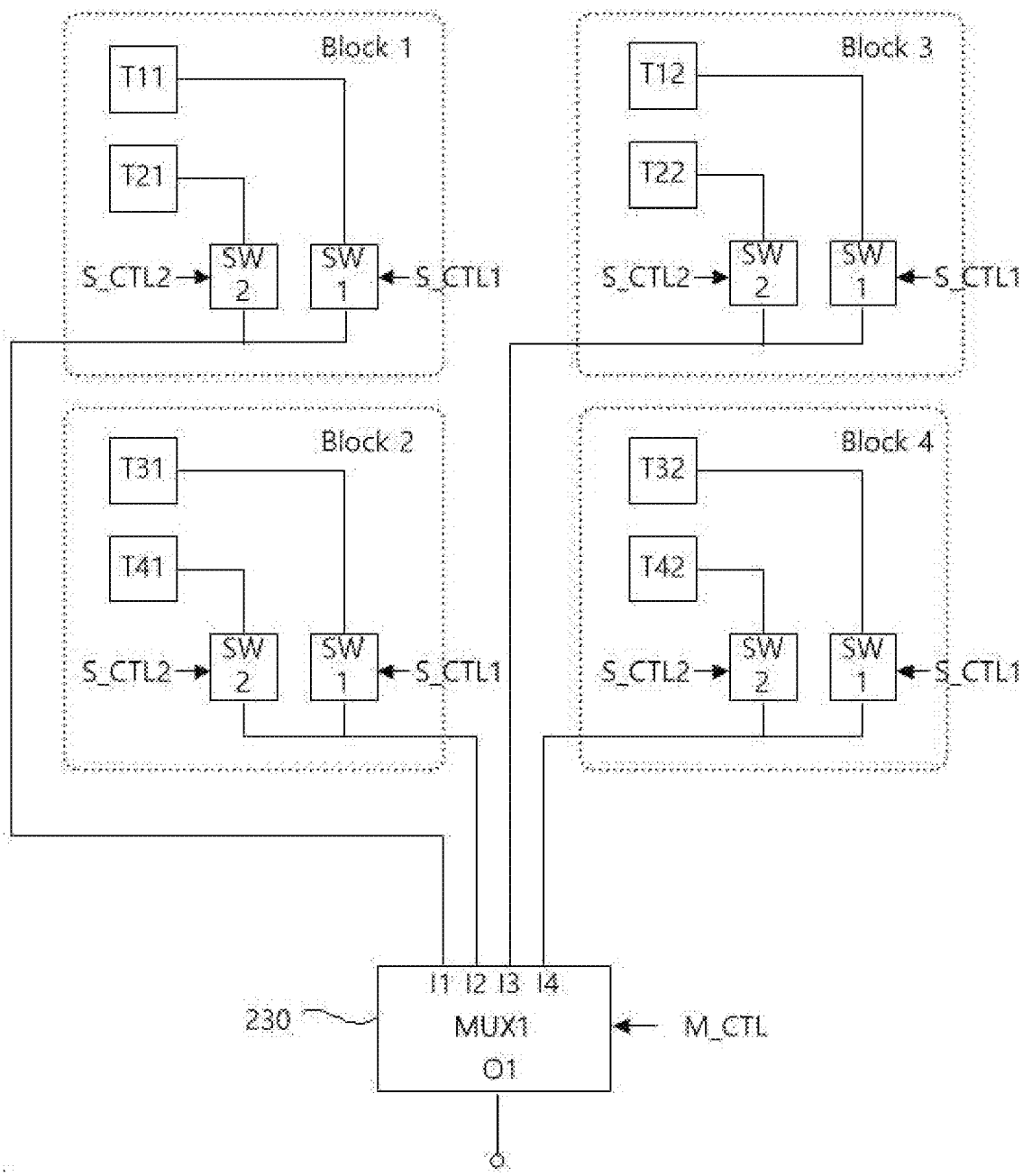
FIG. 3 is a diagram illustrating an example of a configuration in a first group classified according to the exemplary embodiment of the present invention.

FIG. 3 is a diagram illustrating an example of a configuration in the first group classified according to the exemplary embodiment of the present invention.

According to the exemplary embodiment of the present invention, each group may be classified into the same number of blocks, and each block may include the same number of touch sensors and the same number of sensor switches.

Referring to FIG. 3, the first group may be classified into first to fourth blocks Block1 to Block4, and each of the first to fourth blocks Block1 to Block4 may include two touch sensors and two sensor switches SW1 and SW2.

The sensor switch SW may make the touch sensor connected to the sensor switch be in an operation state of a sensing pad that generates touch capacitance Ct for touch detection or an operation state of a driving pad that does not generate the touch capacitance Ct for non-detection of a touch.

Herein, the sensor switch SW may be variously referred to by any other name, such as a state conversion switch (state conversion SW).

A first switch control signal S_CTL1 and a second switch control signal S_CTL2 are simultaneously applied to the first to fourth blocks Block1 to Block4, and the first sensor switch SW1 and the second sensor switch SW2 in each block may make the first touch sensor and the second touch sensor in the corresponding block be in different operation states.

For example, the first touch sensors T11, T31, T12, and T32 included in the first to fourth blocks Block1 to Block4, respectively, may be in the operation state of the sensing pad, and the second touch sensors T21, T41, T22, and T42 included in the first to fourth blocks Block1 to Block4, respectively, may be in the operation state of the driving pad.

The first MUX 230 belonging to the first group may be provided with the input ports corresponding to the number of blocks belonging to the first group. For example, four input ports I1 to I4 and one output port O1 may be provided in the first MUX 230, and a MUX control signal M_CTL interlocked with the first and second switch control signals S_CTL1 and S_CTL2 may be applied to the first MUX 230.

For example, the MUX control signal M_CTL is the control signal for sequentially selecting one among the four touch sensors operating as the sensing pads in the first to fourth blocks Block1 to Block4, and may be interlocked with the first and second switch control signals S_CTL1 and S_CTL2.

Herein, the MUX and the sensor switch may be disposed outside the touch drive IC as described above. For example, the MUX and the sensor switch may be disposed on a touch screen panel or a display to which the touch screen is applied.

Figure 4:
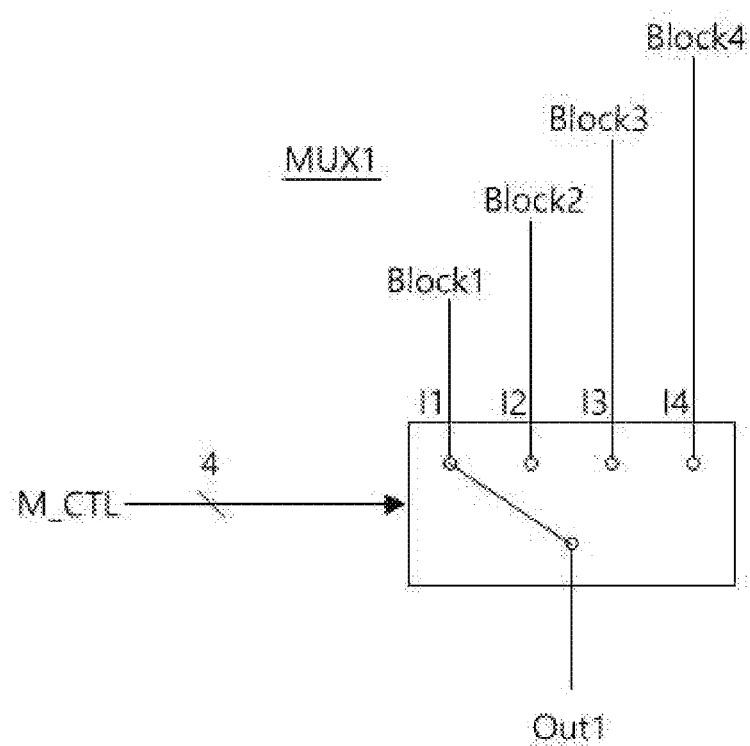
FIG. 4 is a diagram illustrating an example of a configuration of a first MUX according to the exemplary embodiment of the present invention.

FIG. 4 is a diagram illustrating an example of a configuration of the first MUX according to the exemplary embodiment of the present invention.

According to the exemplary embodiment of the present invention, the plurality of input ports and one output port may be provided in one MUX, and the MUX control signal applied to the MUX may be interlocked with the switch control signals.

Referring to FIG. 4, the four input ports I1 to I4 and one output port O1 may be provided in the first MUX 230, and the MUX control signal M_CTL interlocked with the first and second switch control signals S_CTL1 and S_CTL2 may be applied to the first MUX 230.

For example, the first MUX 230 may select the first touch sensor T11 operating as the sensing pad within the first block Block1 by selecting the first input port I1, select the first touch sensor T31 operating as the sensing pad within the second block Block2 by selecting the second input port I2, select the first touch sensor T12 operating as the sensing pad within the third block Block3 by selecting the third input port I3, and then select the first touch sensor T32 operating as the sensing pad within the fourth block Block1 by selecting the fourth input port I4.

That is, the first MUX 230 may sequentially select the first touch sensors T11, T31, T12, and T32 in the first to fourth blocks which are sequentially switched by the MUX control signal M_CTL interlocked with the first and second switch control signals and being operating as the sensing pads.

Then, the first MUX 230 may select the second touch sensor T21 operating as the sensing pad within the first block by selecting the first input port I1, select the second touch sensor T41 operating as the sensing pad within the second block by selecting the second input port I2, select the second touch sensor T22 operating as the sensing pad within the third block by selecting the third input port I3, and then select the second touch sensor T42 operating as the sensing pad within the fourth block by selecting the fourth input port I4.

That is, the first MUX 230 may sequentially select the second touch sensors T21, T41, T22, and T42 in the first to fourth blocks which are sequentially switched by the MUX control signal M_CTL interlocked with the first and second switch control signals and being operating as the sensing pads. Accordingly, the scanning operation of the touch detection may be performed in the unit of the block.

Figure 5:
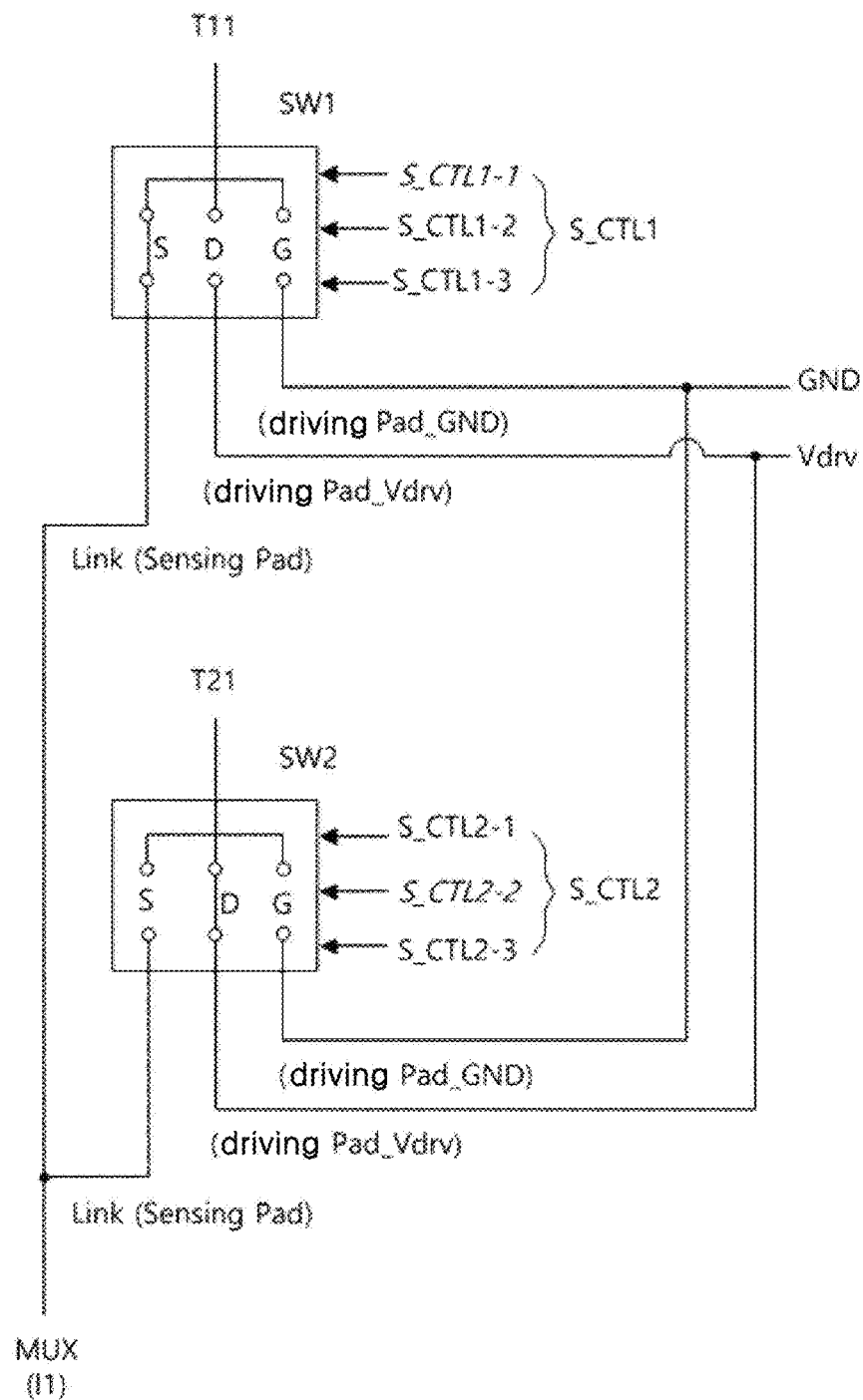
FIG. 5 is a diagram illustrating an example of a configuration of an exemplary embodiment of sensor switches in the first block classified according to the exemplary embodiment of the present invention.

FIG. 5 is a diagram illustrating an example of the configuration of the sensor switches in the first block classified according to the exemplary embodiment of the present invention.

According to the exemplary embodiment of the present invention, the same number of touch sensors and sensor switches may be included in one block. For example, in the first block Block1, the first and second touch sensors T11 and T21 and the first and second sensor switches SW1 and SW2 may be included.

The sensor switch may be provided with one or more state conversion ports so as to make the touch sensor connected to the sensor switch be in the operation state of the sensing pad or the operation state of the driving pad.

Referring to FIG. 5, first to third ports S, D, and G may be provided in each of the first sensor switch SW1 and the second sensor switch SW2, and the first port S may be a link port for connecting the touch sensor and the MUX, the second port D may be a driving voltage Vdrv port for connecting the touch sensor and the driving voltage, and the third port G may be a ground GND port for connecting the touch sensor and a ground.

Herein, the driving voltage is the DC voltage alternated between a high level and a low level, and as described with reference to FIG. 2, the driving voltage may be the touch driving voltage supplied by the voltage generating unit 248.

The second port D existing between the first port S and the third port G may be deleted, or expanded to two or more ports D1 and D2.

For example, based on the touch sensor which is connected with the first port S1 and operates as the sensing pad, in the case where the touch sensors adjacent in the vertical direction within the same column are connected with the second port D and operate as the driving pads, line-to-line capacitance is generated between the sensor signal line of the sensing pad and the sensor signal lines of the driving pads, and sensitivity of touch detection may be improved by using the line-to-line capacitance.

Herein the particular technical contents of improving sensitivity of touch detection by using the line-to-line capacitance are already described in detail in Korean Patent No. 10-1602842 of the applicant of the present application, so that the description thereof will be omitted below.

Referring to FIG. 5, three different switch control signals S_CTL1-1, S_CTL1-2, and S_CTL1-3 may be applied to the first sensor switch SW1 in order to operate the touch sensor T11 connected with the first sensor switch as the sensing pad.

For example, the first port S of the first sensor switch SW1 is on by the switch control signal S_CTL1-1 and the remaining second port D and third port G are off by the switch control signals S_CTL1-2 and S_CTL1-3, so that the touch sensor T11 connected to the first sensor switch may be in the operation state of the sensing pad.

In the meantime, three different switch control signals S_CTL2-1, S_CT2-2, and S_CTL2-3 may be applied to the second sensor switch SW2 so as to operate the touch sensor T21 connected with the second sensor switch as the driving pad and so as for the driving voltage to be applied to the touch sensor T21.

For example, the second port D of the second sensor switch SW2 is on by the switch control signal S_CTL2-2 and the remaining first port S and third port G are off by the switch control signals S_CTL2-1 and S_CTL2-3, so that the touch sensor T21 connected to the second sensor switch may be in the operation state of the driving pad to which the driving voltage is applied.

Figure 6:
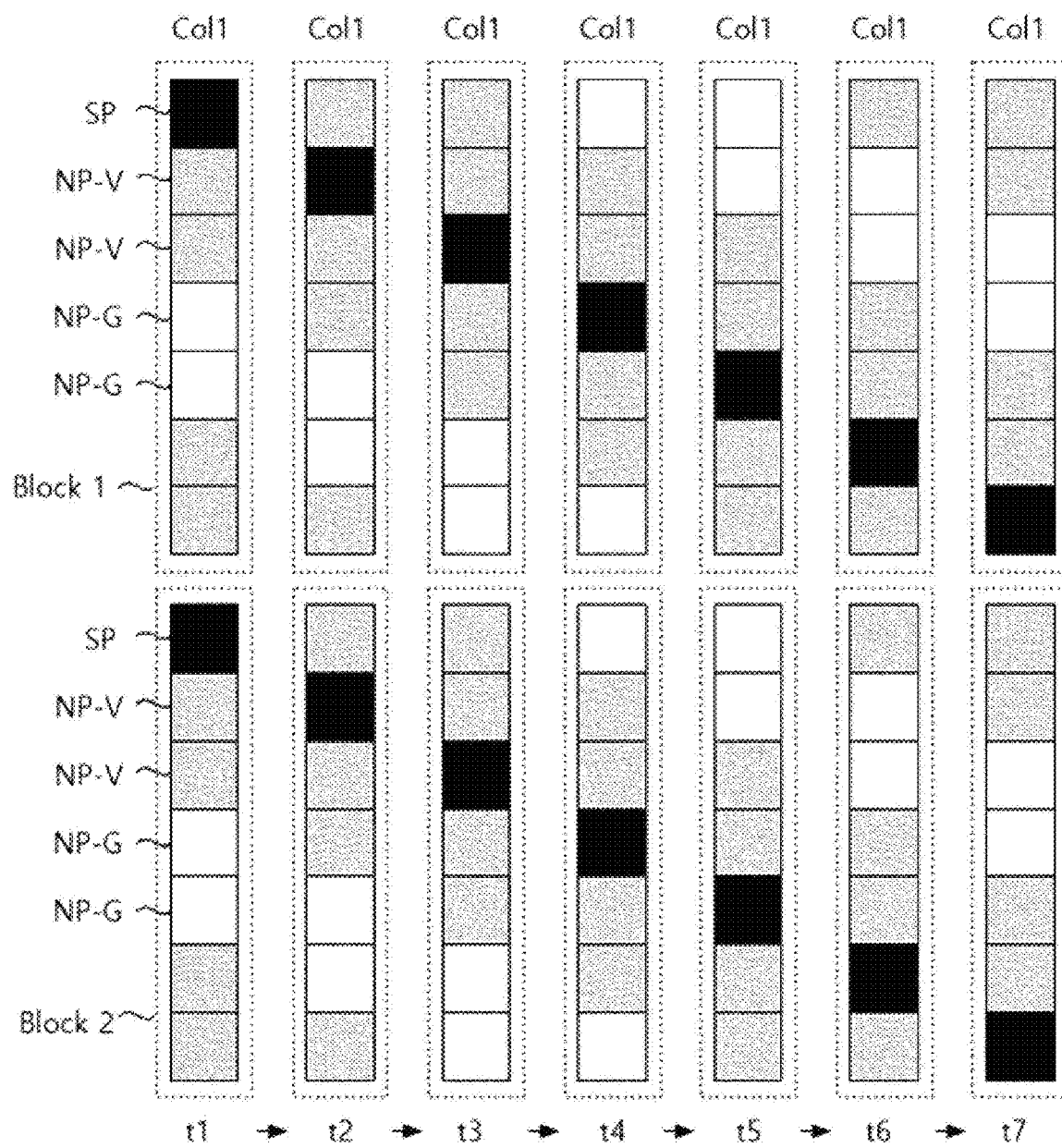
FIG. 6 is a diagram illustrating an example of a change in an operation state for touch sensors of a first column according to the exemplary embodiment of the present invention.

FIG. 6 is a diagram illustrating an example of a change in the operation state for the touch sensors of the first column according to the exemplary embodiment of the present invention.

For the convenience of the particular description of the exemplary embodiment of the present invention, as illustrated in FIG. 6, the present invention will be described based on an example in which 14 touch sensors are included in the first column Col1, and the first column Col1 is classified into the first block Block1 and the second block Block2.

As described above, the same number of touch sensors and sensor switches are included in each block, so that seven touch sensors and seven sensor switches are included in the first block and the second block.

First to seventh control signals for controlling the seven sensor switches are applied to the first block and the second block, and according to the first to seventh control signals, from the first touch sensor to the seventh touch sensor of each of the first block and the second block may be sequentially in the operation state of the sensing pad.

Based on the sensing pad, in the same column, other touch sensors adjacent in the vertical direction may be the driving pads and receive the driving voltage, and the remaining touch sensors may be the driving pads and be connected with the ground.

Referring to FIG. 6, at an operation time t1, each of the first touch sensors of the first block and the second block may become the sensing pad SP, and each of the second, third, sixth, and seventh touch sensors of the first block and the second block may be the driving pad NP-V to which the driving voltage is applied, and each of the fourth and fifth touch sensors of the first block and the second block may be the driving pad NP-G connected with the ground.

Then, at an operation time t2, each of the second touch sensors of the first block and the second block may become the sensing pad SP, and each of the first, third, fourth, and seventh touch sensors of the first block and the second block may be the driving pad NP-V to which the driving voltage is applied, and each of the fifth and sixth touch sensors of the first block and the second block may be the driving pad NP-G connected with the ground.

Then, at an operation time t3, each of the third touch sensors of the first block and the second block may become the sensing pad SP, and each of the first, second, fourth, and fifth touch sensors of the first block and the second block may be the driving pad NP-V to which the driving voltage is applied, and each of the sixth and seventh touch sensors of the first block and the second block may be the driving pad NP-G connected with the ground.

Then, as illustrated in FIG. 6, at each of the operation times t4 to t7, the sensing pad SP and the driving pads NP-V and NP-G may be sequentially changed within each block. Herein, the first block and the second block belong to the first group corresponding to the first MUX as described above, so that the sensing pads sequentially changed in the first block may be sequentially output through the first port of the first MUX and the sensing pads sequentially changed in the second block may be sequentially output through the first port of the first MUX.

Accordingly, it is a result of sequentially scanning the 14 touch sensors belonging to the first column. In the meantime, in each block, the number of driving pads NP-V which exists between the sensing pad SP and the driving pad NP-G connected to the ground and to which the driving voltage applied may be, for example, two, zero, one, or three or more as illustrated in the operation time t4 of FIG. 6.

Figure 7:
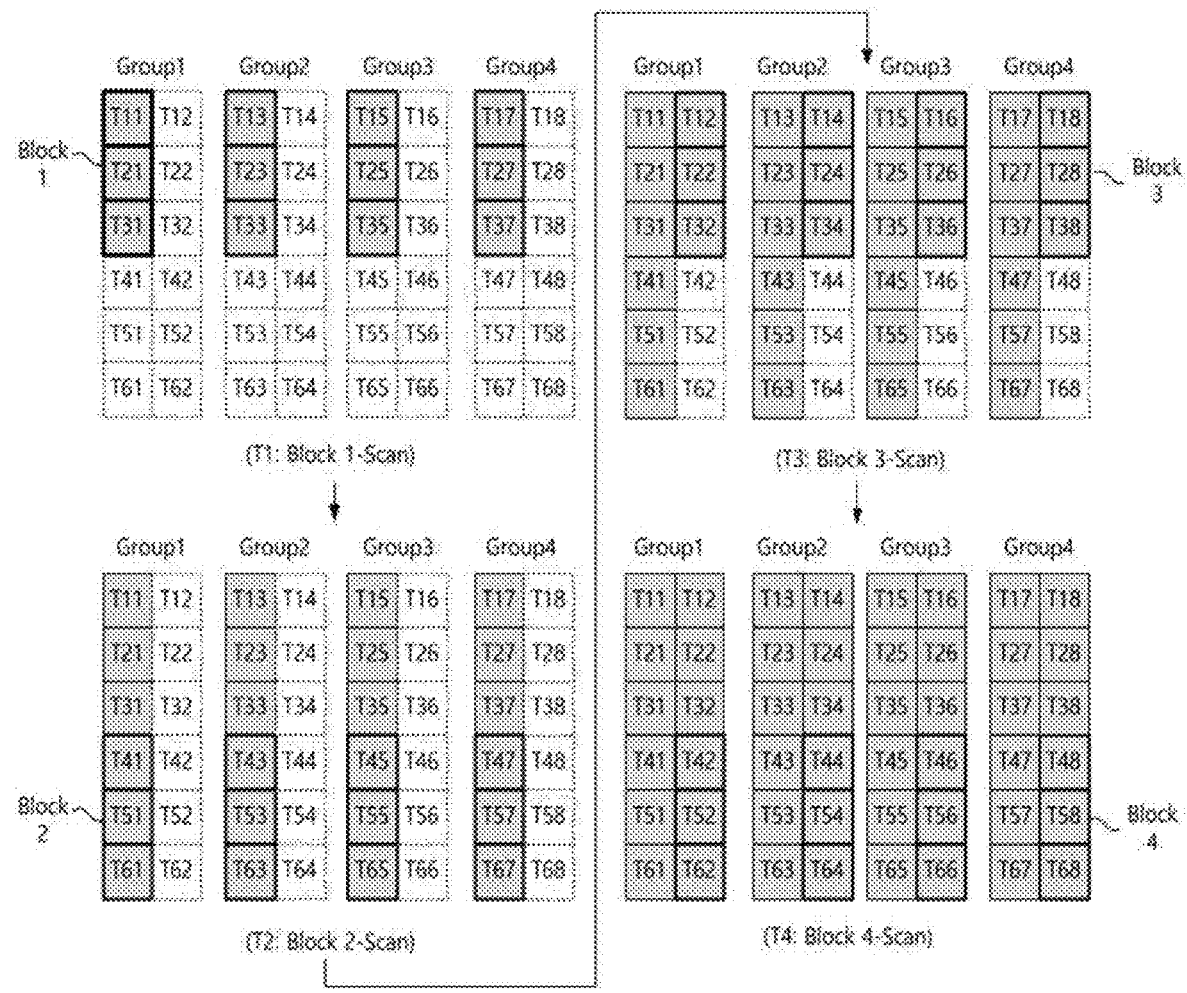
FIG. 7 is a diagram illustrating an example of a scanning process for detecting a touch according to the exemplary embodiment of the present invention.

FIG. 7 is a diagram illustrating an example of a scanning process for detecting a touch according to the exemplary embodiment of the present invention.

For the convenience of the particular description of the exemplary embodiment of the present invention, as illustrated in FIG. 7, the present invention will be described based on an example in which six touch sensors are included in each column, and two adjacent columns are classified into one group, three touch sensors in a vertical directions among six touch sensors in each column are classified into each block.

Referring to FIG. 7, the scan operation is performed in a row direction in order to detect a touch, and in the touch detecting method of dividing an odd field (or odd column) and an even field (or even column) and performing sequential scanning, at an operation time T1 for performing a first block scanning operation Block1-Scan, the touch sensors belonging to the first block in each group sequentially become the sensing pads.

Then, at an operation time T2 for performing a second block scanning operation Block2-Scan, the touch sensors belonging to the second block in each group sequentially become the sensing pads, and then, at an operation time T3 for performing a third block scanning operation Block3-Scan, the touch sensors belonging to the third block in each group sequentially become the sensing pads.

Then, at an operation time T4 for performing a fourth block scanning operation Block4-Scan, the touch sensors belonging to the fourth block in each group sequentially become the sensing pads.

Accordingly, by performing the scanning operation of the odd field of sequentially performing the scanning operation on the first block and the second block and then performing the scanning operation of the even field of sequentially performing the scanning operation on the third block and the fourth block, it is possible to obtain a scan result of the touch detection for one frame by summing the scan results of the odd field and the even field.

Figure 8:
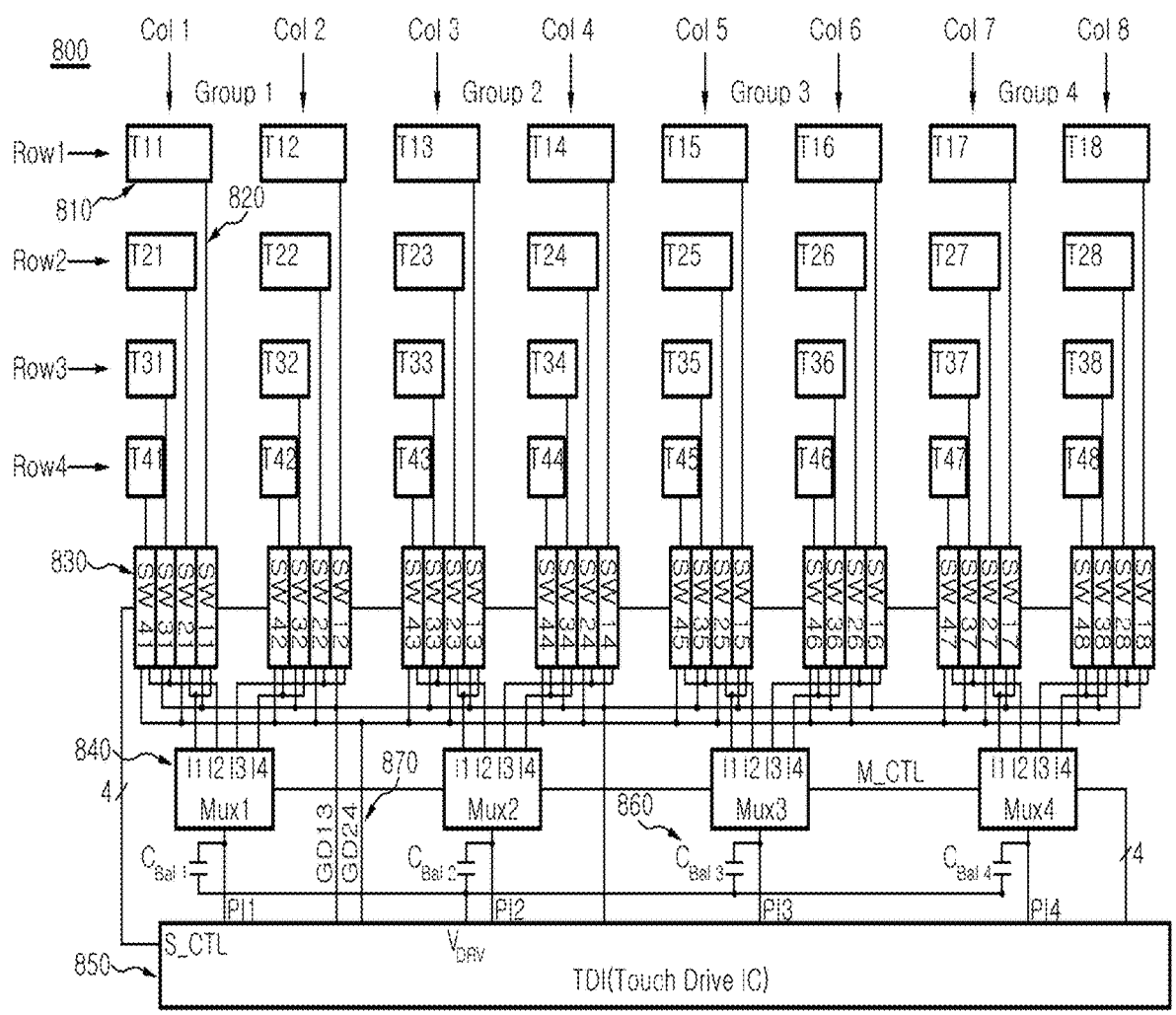
FIG. 8 is a diagram illustrating an example of a configuration of a touch screen including a touch sensor operated by a voltage directly applied from a touch drive IC TDI according to the exemplary embodiment of the present invention.

FIG. 8 is a diagram illustrating an example of a configuration of a touch screen including the touch sensor operated by a voltage directly applied from the touch drive IC TDI according to the exemplary embodiment of the present invention.

FIG. 8 is a diagram illustrating an example of another configuration of a touch screen including the decreased number of signal lines of the control ports and the input ports of the sensor switch compared to the configuration of the touch screen provided with the MUXs and the sensor switch illustrated in FIG. 2.

As illustrated in FIG. 5, in the configuration of the touch screen provided with the MUXs and the sensor switches, each sensor switch includes three transistors and requires seven ports, particularly, input ports, three control ports serving as the state conversion ports, and one sensor connection ports.

The sensor switch has a problem in that the two fixed voltages GND and Vdrv applied to the touch sensor are applied from the separate voltage source, so that in order to prevent an instantaneous short when the state of the touch sensor is converted from the driving state Vdrv to the driving state GND, the touch sensor needs to additionally maintain a floating state in the middle.

When the driving state Vdrv is converted to the driving state GND or the driving state GND is converted to the driving state Vdrv, the touch sensor passes through the floating state, so that there is a problem in that the total sensing time increases and the control of the touch screen is complex.

As the size of the display increases, the number of sensor switches connected to each touch sensor also increases, and the number of signal lines of the control ports and the input ports for controlling each sensor switch also increases.

Accordingly, the decrease in the number of signal lines of the control ports and the input ports of the sensor switch in the touch screen provided with the plurality of MUXs and the sensor switches of FIG. 2 is the always required technical problem.

In order to simultaneously solve the problems in increasing the total sensing time and the number of signal lines, the exemplary embodiment illustrated in FIG. 8 includes a touch screen 800 including touch sensors operated by voltages S_OUT_U1, S_OUT_D1 870 directly applied from a touch drive IC TDI.

The voltage directly applied from the touch drive IC TDI is a programmable voltage, so that various types of voltage may be provided (for example, HIGH/LOW DC voltage, Square Wave, Hi-z (Tri-state)), and the touch screen with high efficiency may be implemented by supplying a fast switching signal to the sensor switch SWxx. Further, according to the exemplary embodiment of FIG. 8, it is easy to convert the state for line sensing and frame sensing.

Figure 9:
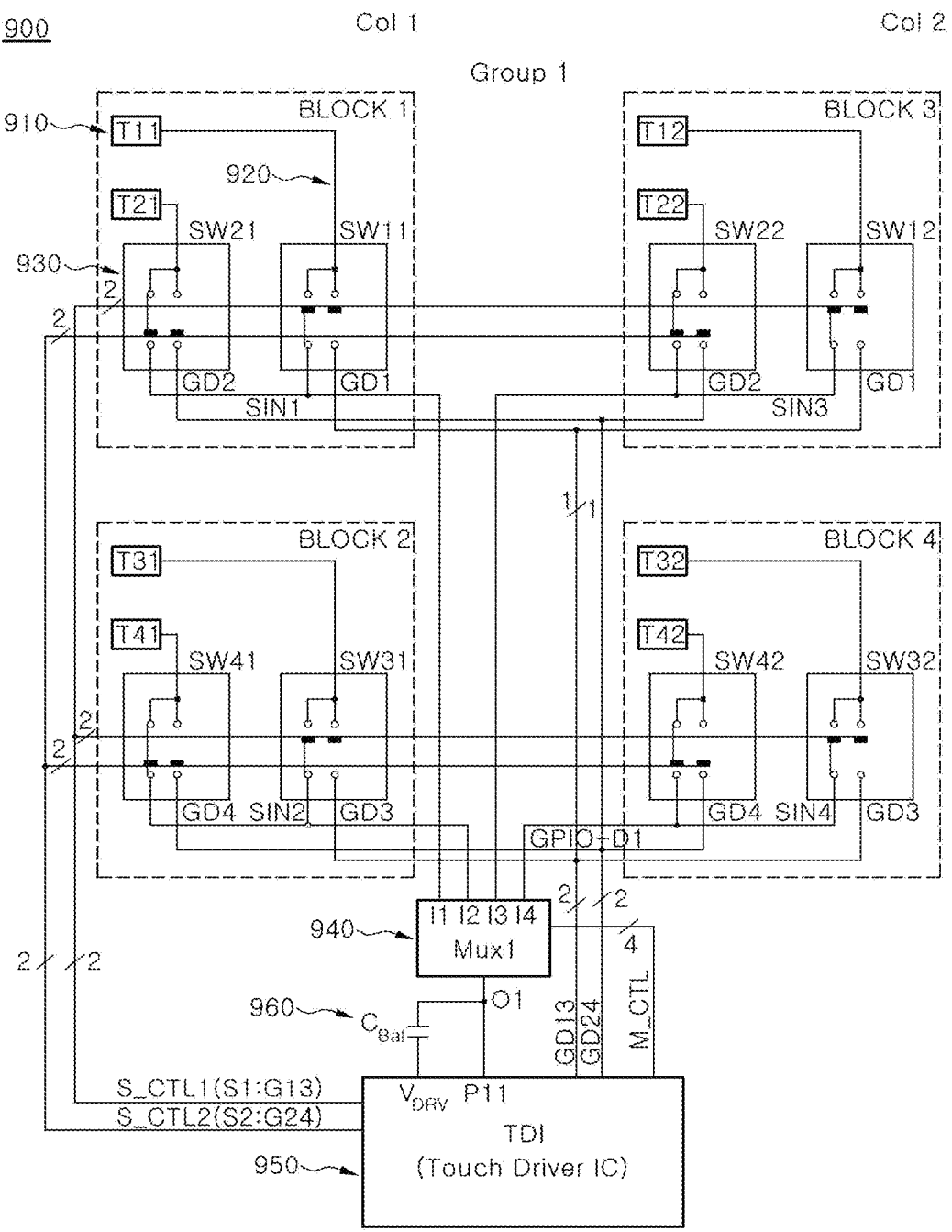
FIG. 9 is a diagram illustrating an example of a configuration in the first group classified according to the exemplary embodiment of FIG. 8.

FIG. 9 is a diagram illustrating an example of a configuration in the first group classified according to the exemplary embodiment of FIG. 8.

Referring to FIG. 9, the first group may be classified into first to fourth blocks Block1 to Block4, and each of the first to fourth blocks Block1 to Block4 may include two touch sensors (for example, T11 and T21) and two sensor switches (for example, SW11 and SW21).

The sensor switch (for example, the sensor switch SW11) may apply Vdrv, GND, or a specific voltage so as for the connected touch sensor to operate as the sensing pad for touch detection or operate as the driving pad for non-detection of touch.

Each of a first switch control signal S_CTL1(S1:G13) and a second switch control signal S_CTL2(S2:G24) is applied to the first to fourth blocks Block1 to Block4 at the same time, and the first sensor switch (for example, SW11) and the second sensor switch (for example, SW21) in each block may make the first touch sensor and the second touch sensor in the corresponding block be in the different operation states.

For example, the first touch sensors T11, T31, T12, and T32 included in the first to fourth blocks Block1 to Block4, respectively, may be in the operation state of the sensing pad, and the second touch sensors T21, T41, T22, and T42 included in the first to fourth blocks, respectively, may be in the operation state of the driving pad.

The first MUX 940 belonging to the first group may be provided with the input ports corresponding to the number of blocks belonging to the first group. For example, four input ports I1 to I4 and one output port O1 may be provided in the first MUX 940, and four MUX control signals M_CTL interlocked with the control signals S_CTL1(S1:G13) and S_CTL2(S2:G24) of the sensor switches SW11 and SW21 may be applied to the first MUX 940.

For example, the sensing pads of each of the first to fourth blocks Block1 to Block4 are divided into upper and lower parts and operate, and when the four upper touch sensors (for example, T11, T12, T31, and T32) are selected based on the control signal S_CTL1(S1:G13) of the sensor switch (for example, SW11, SW12, SW31, and SW32), the MUX control signal M_CTL sequentially selects and senses the four upper touch sensors one by one. In the meantime, when the four lower touch sensors (for example, T21, T22, T41, and T42) are selected based on the control signal S_CTL2(S2:G24) of the sensor switch (for example, SW21, SW22, SW41, and SW42), the MUX control signal M_CTL sequentially selects and senses the four lower touch sensors one by one.

Herein, the MUX and the sensor switch may be disposed outside the touch drive IC as described above, and may be formed on a substrate around the touch screen panel.

According to the exemplary embodiment of the present invention, FIG. 9 may include the same number of touch sensors and sensor switches in one block. For example, in the first block Block1, the first and second touch sensors T11 and T21 and the first and second sensor switches SW11 and SW21 may be included.

The sensor switches SW11 and SW21 may be provided with one or more state conversion ports S_CTL1 and S_CTL2 so as to make the connected touch sensors be in the operation state of the sensing pad or the operation state of the driving pad.

Referring to FIG. 9, the first sensor switches SW11, SW31, SW12, and SW32 and the second sensor switches SW21, SW41, SW22, and SW42 may include two ports (SIN1, GD1), (SIN2, GD3), (SIN3, GD1), and (SIN4, GD3) and (SIN1, GD2), (SIN2, GD4), (SIN3, GD2), and (SIN4, GD4), respectively, and the first port S_IN1-4 may be a link port for connecting the touch sensor and the MUX, and the second port GD1-4 may be a port for applying a GND voltage or a separate voltage for applying a driving Vdrv voltage or the GND voltage for connecting the driving voltage to the touch sensor. In the present example, the second port (GD1, GD3) and the second port (GD2, GD4) may apply a total of two driving (non-sensing) voltages, that is, the second port (GD1, GD3) may apply one driving (non-sensing) voltage to the upper part of the block and the second port (GD2, GD4) may apply one driving (non-sensing) voltage to the lower part of the block.

Herein, the driving voltage is a DC voltage alternated between a high level and a low level or a DC voltage having a predetermined size, and may be a touch driving voltage supplied by the touch drive IC TDI 950.

Figure 10A:
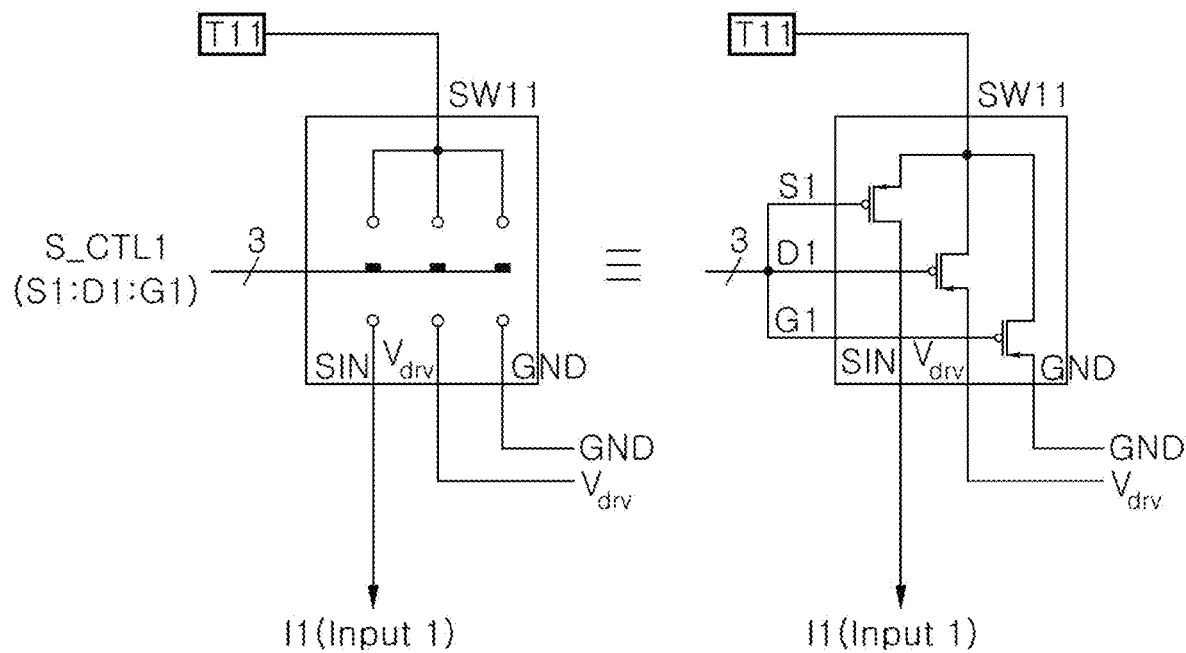
FIG. 10A is a diagram illustrating a sensor switch formed with three P-type transistors which switch an external voltage and a sensing signal as a related art.

FIG. 10A illustrates a configuration of a sensor switch using an external voltage source in the related art.

The driving state Vdrv and the driving state GND in FIG. 10A are supplied from a separate external voltage source, so that there is a problem in that the touch sensing time increases and the number of signal lines increases as mentioned above.

The sensor switch may be provided with one or more state conversion ports S_CTL1 and S_CTL2 so as to make the touch sensor connected to the sensor switch be in the operation state of the sensing pad or the operation state of the driving pad.

The sensor switch may be provided with first to third ports SIN, Vdrv, and GND, and the first port SIN may be a port serving as a link for connecting the touch sensor and the MUX, the second port Vdrv may be a driving voltage Vdrv port for connecting the driving voltage in order to make the touch sensor operate as the non-sensing pad, and the third port GND may be a ground GND port for connecting a ground in order to make the touch sensor operate as the non-sensing pad.

The driving voltage of the sensor switch is the DC voltage alternated between the high level and the low level, and may be a touch driving voltage supplied by a voltage generating unit of the TDI.

In order to operate the touch pad or the touch screen, two different switch control signals S_CTL1-1 and S_CTL1-2 may be applied to the sensor switch, and in order to make the touch pad operate as the sensing pad, as illustrated in FIG. 10A, the first port SIN supplying the sensing voltage to the touch sensor is on by a signal S1 of the switch control signal S_CTL1-1, and the remaining second port Vdrv and third port GND are off by a signal D1 of the switch control signal S_CTL1 and a signal G1 of the switch control signal S_CTL1, so that the touch sensor T11 operates as the sensing pad.

The sensor switch of FIG. 10A may include a three-terminal-type switching element, and the switching element requires three ports and three control ports.

The switch SW11 of FIG. 10A include seven input/output (IO) ports and three transistors, and one sensing signal is input to the MUX by the control signal S1, and two fixed voltages GND and Vdrv are applied to the touch sensor from the separate external voltage sources by the control signals G1 and D1, respectively.

The transistor configuring the switch SW11 of FIG. 10A is the P-type, so that the turn on voltages of the control signals S1, D1, and G1 are the negative voltages (−V), and the turn off voltages are the positive voltages (+V), each of which needs to be applied to a P-TFT gate.

Figure 10B:
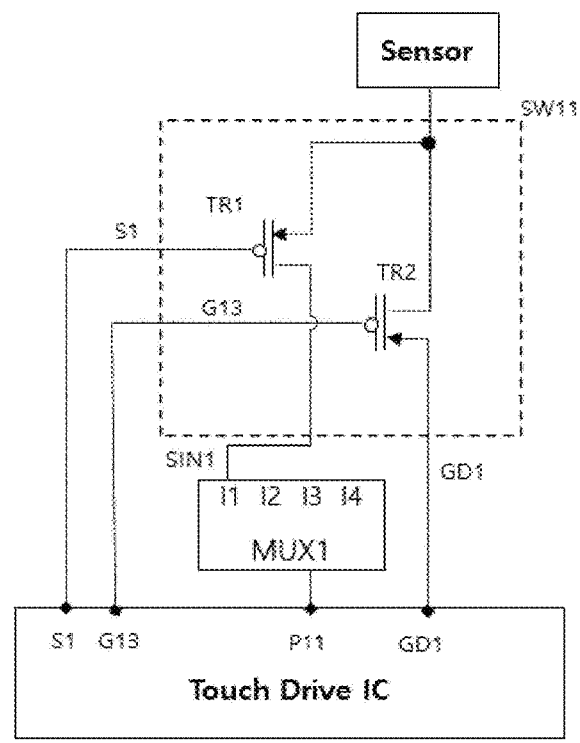
FIG. 10B is a diagram (b1) illustrating a sensor switch formed by reducing the three P-type transistors of FIG. 10A to two P-type transistors, and is a table (b2) summarizing input/output of the sensor switch according to application of a +V/−V driving voltage.

FIG. 10B is a table in which the configuration of the sensor switch formed of only the P-type transistor and an output of the sensor switch for an input voltage in the related art are summarized.

b1 of FIG. 10B is one of the sensor switches SW11 located in the block of FIG. 9, and is formed of five I/O ports and two transistors to implement touch sensor sensing and driving touch sensor loading by controlling a gate of each transistor.

The touch drive IC TDI of b1 of FIG. 10B is characterized in that a voltage is applied to the touch sensor through one voltage port GD1.

For example, two fixed voltages GND and Vdrv may be selectively supplied through one voltage port GD1 of the touch drive IC TDI. Unlike the application of the voltage by the separate external voltage source illustrated in FIG. 10A, the voltage applied from the touch drive IC TDI is the programmable voltage, and it is not necessary to separately provide multiple voltage sources according to the type of voltage.

Unlike the application of the voltage by the separate external voltage source illustrated in FIG. 10A, in the application of the voltage by the touch drive IC TDI of FIG. 10B, floating noise is removed in the floating state in the middle when the driving state of the driving voltage Vdrv is converted to the driving state of the ground voltage GND or the driving state of the ground voltage GND is converted to the driving state of the driving voltage Vdrv, so that the total touch sensing time of the touch screen is decreased.

The first pot SIN of the sensor switch SW11 may be the port serving as a link for connecting the touch sensor and the MUX, and the second port GD1 may be the driving voltage Vdrv, the ground GND, or the programmable voltage port for connecting the driving voltage for making the touch sensor operate as the driving pad.

The voltage applied through the voltage port of the sensor switch of the touch drive IC TDI is interlocked with the sensor switch control signals S_CTL1 and S_CTL2 of the touch drive IC TDI of FIG. 9, so that the touch sensor operates as the sensing mode or the driving mode.

Through this, not only the line sensing that senses the touch sensors in the unit of the row, but also the frame sensing that senses the total touch sensors may be implemented.

b2 of FIG. 10B is the table in which the output of the sensor switch for the input voltage in the configuration of the sensor switch formed of only the P-type transistor is summarized.

The touch sensor is in a sensing state by applying a low voltage (for example, −10 V) to the gate of the first transistor TR1 and applying a high voltage (for example, +10 V) to the gate of the second transistor TR2.

The touch sensor is in a driving state of the driving voltage by applying a high voltage (for example, +10 V) to the gate of the first transistor TR1 and applying a low voltage (for example, −10 V) to the gate of the second transistor TR2.

The material of the MUX of FIG. 8 and the transistor material used in the sensor switch SW11 of FIG. 10A and b1 of FIG. 10B is Low Temperature Poly Silicon (LTPS) and is formed of only a P-Thin Film Transistor (P-TFT), so that the negative voltage (−V) needs to be applied to the gate of the P-TFT for the turn-on and the positive voltage (+V) needs to be applied to the gate of the P-TFT for the turn-off.

To this end, a high operation voltage is required during IC operation and a high process voltage needs to be used during IC manufacturing, which causes many problems, such as an increase in a chip size, an increase in IC price, an increase in power consumption due to high IC operation voltage, and an increase in electromagnetic wave (Electromagnetic Interference (EMI)) noise.

Figure 11:
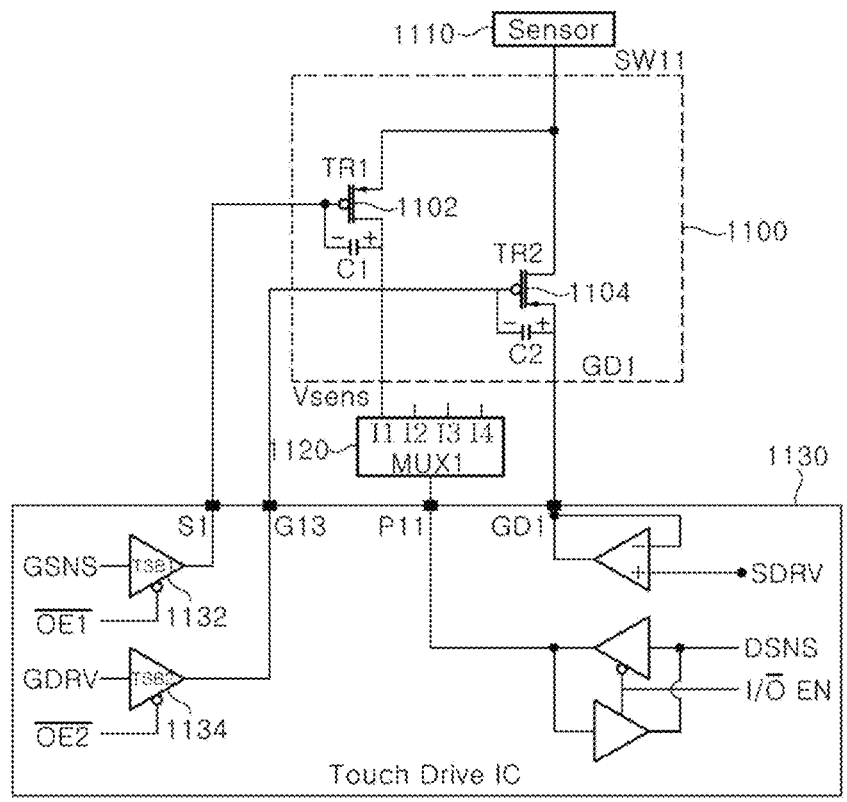
FIG. 11 is a diagram (a1) illustrating a sensor switch formed with two P-type transistors and a tri-state buffer (a1) for driving a gate of the sensor switch according to the present invention, and is a table (a2) representing input and output of the sensor switch in an order of sensing and driving.

FIG. 11 is a diagram (a1) illustrating a sensor switch formed of two P-type transistors and a tri-state buffer (a1) for driving a gate of the sensor switch according to the present invention, and is a table (a2) representing input and output of the sensor switch in an order of sensing and driving.

The sensor switch 1100 of the present invention illustrated in FIG. 11 is formed of two P-type transistors similar to FIG. 10B, but is different from the sensor switch of FIG. 10B in that capacitors C1 and C2 are added between gates and sources of the P-type transistors 1102 and 1104, respectively, and tri-state buffers 1132 and 1132 are added to a touch drive IC 1130 for controlling and driving the gate of the sensor switch.

a2 of FIG. 11 discloses a table in which input and output of the sensor switch are represented in an order of sensing and driving.

The sensor switch illustrated in FIG. 10B is formed of only the P-type transistor, and the negative voltage (−V) is applied to the gates S1 and G13 of the transistor for transmitting the voltage GND to +V which has been applied to the source GD1 of the transistor to a drain.

To this end, the touch drive IC TDI needs to generate the negative voltage (−V) and a voltage use range of the sensor switch is −V to +V, so that the applied process is the high voltage process, thereby increasing power consumption and an IC area, and also increasing IC unit price.

In order to solve the problem, as illustrated in a2 of FIG. 11, the present invention may transmit the low voltage GND from the source to the drain by removing the negative voltage (−V) and applying the positive voltage (GND to +V) to the gate, thereby decreasing power consumption, an IC area, and IC unit price.

a1 of FIG. 11 schematically illustrates a section of a partial touch sensor 1110 of the touch screen, and as mentioned above, the touch sensor 1110 is characterized in that (i) capacitance C1 and C2 between the gates and the sources of the transistors Tr1 and Tr2 within the sensor switch increases, and (ii) a buffer structure of the input ports S1 and G13 is included in the touch drive IC TDI.

The touch screen of the present invention is different from that of b2 of FIG. 10 in that the driving order is set in each of the sensing mode and the driving mode as illustrated in a2 of FIG. 11.

As a result, the operations in the sensing mode and the driving mode of the touch sensor formed of the two P-type transistors illustrated in FIG. 11 do not use the negative voltage (−V).

Figure 1:
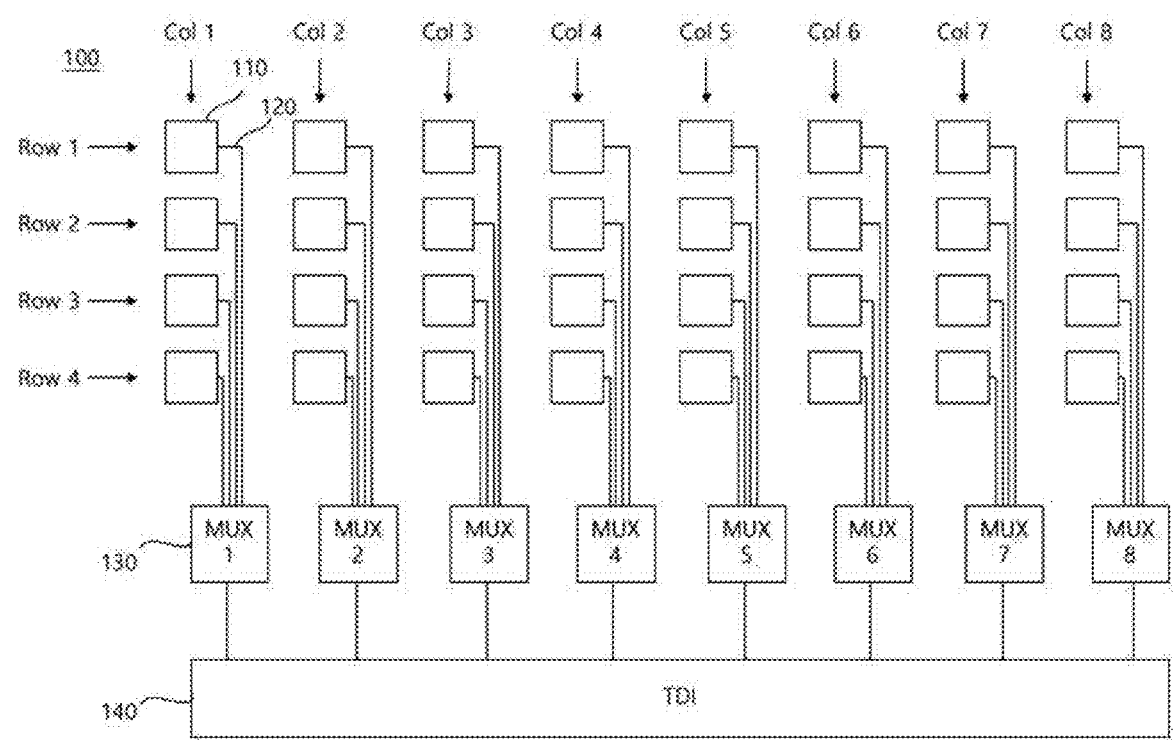
FIG. 1 is a diagram illustrating an example of a configuration of a touch screen provided with a MUX in the related art.

One touch sensor 1110 illustrated in FIG. 11 is illustrated for convenience of the description, but in the entire touch screen, the plurality of touch sensors may be formed in the form of the matrix as illustrated in FIG. 1.

The plurality of touch sensors may maintain the sensing state in which a touch is input and the driving state in which the touch is not input.

The touch screen of the present invention includes a plurality of sensor switches which is capable of independently controlling the state of each of the touch sensors 1110. For convenience of the description, FIG. 11 illustrates only one sensor switch 1100.

The sensor switch 1100 is formed of only the P-type transistor as mentioned above, and includes a first P-type transistor 1102 and a second P-type transistor 1104 as illustrated in FIG. 11.

The sensor switch 1100 of the present invention includes a first capacitor C1 connecting a gate and a source of the first transistor 1102 and a second capacitor C2 connecting a gate and a source of the second transistor 1104.

The first capacitor C1 and the second capacitor C2 performs charge or reverse charge according to a driving voltage applied from the touch drive IC 1130 to control a mode or a state of the touch sensor 1110.

The reverse charge means, for example, conduction in the opposite direction to the direction of charge.

For example, when both voltage polarities of the capacitor C1 in a1 of FIG. 11 are −, +, the first capacitor TR1 is conductive, and when both voltage polarities of the capacitor C1 are +, −, the first capacitor TR1 is blocked. That is, on/off of the first transistor TR1 is controlled by charge/reverse charge of the capacitor C1.

The touch screen of the present invention includes the plurality of MUXs.

For convenience of the description, one MUX 1120 is illustrated in FIG. 11, and the MUX 1120 groups the touch sensors into the plurality of groups, and blocks each group to a plurality of blocks to control the touch sensors in the unit of the block.

The touch drive IC 1130 detects a touch based on the touch capacitance Ct generated in at least one or more touch sensors in the sensing state, or provides the voltage applied to the plurality of touch sensors in the driving state.

The voltage applied to the sensor switch of the touch screen of the present invention is simply a positive voltage, and the positive voltage includes zero voltage.

For the purpose of the example, the range of the positive voltage may be 0 V to +10 V.

Investigating the operation of the sensor switch when the touch sensor 1110 is in the sensing state, the first capacitor C1 is charged and the first transistor 1102 is turned on, so that the voltage of the touch capacitance generated in the touch sensor 1110 is output to the touch drive IC through the MUX 1120.

In particular, the output in the sensing state outputs Vs in the sensing mode of a2 of FIG. 11.

Investigating the operation of the sensor switch when the touch sensor 1110 is in the driving state, the second capacitor C2 is charged and the second transistor 1104 is turned on, so that a predetermined DC voltage or the ground (GND) voltage is applied to the touch sensor 110 from the touch drive IC (for example, through the port GD1).

The touch drive IC 1130 includes two tri-state buffers 1132 and 1134 for controlling turn-on or turn off of the first transistor 1102 or the second transistor 1104 and the charge and the reverse charge of the first capacitor C1 or the second capacitor C2.

An output of each of the tri-state buffers is any one of a HIGH/LOW DC voltage and a Hi-z (Tri-state) voltage.

The configuration circuit diagram and the output of the tri-state buffer will be described below in detail with reference to FIG. 12.

The driving state of the sensor switch is divided into two or more sub states according to the voltage applied from the touch drive IC to the touch sensor, and the voltage applied to the touch sensor in the driving state is the voltage programmable by the touch drive IC (particularly, refer to the table of a2 of FIG. 11).

In each sub state, the voltage applied to the touch sensor is different and has any one of a HIGH/LOW DC voltage and a Hi-z (Tri-state) voltage.

The control signal of the MUX 1120 is also generated from the touch drive IC 1130.

The number of MUXs 1120 is the same as the number of groups, and the number of blocks in each group corresponds to the number of input ports of each MUX.

In the example illustrated in FIG. 11, the number of input ports of the MUX 1120 is four, so that four blocks may be configured.

The sensor switches and the MUXs of the present invention are disposed on a touch screen panel on which the touch sensors are arranged.

The touch drive IC 1130 includes a first port P11 for connecting the touch sensor 1100 connected to the sensor switch to the MUX 1120, and a second port GD1 for applying the voltage in the driving state.

The touch drive IC 1130 of the present invention interlocks the switch control signal for controlling the sensor switches and the MUX control signal for controlling the MUXs to perform a touch detection scanning operation in the unit of the block.

The MUX control signal may be identically applied to each MUX, and the switch control signal may be identically applied to each block.

The touch drive IC 1130 may apply different switch control signals to the sensor switches in each block while performing the touch detection scanning operation in the unit of the block, and as a result, it is possible to independently control the touch sensor connected to the sensor switch of each block.

Figure 12:
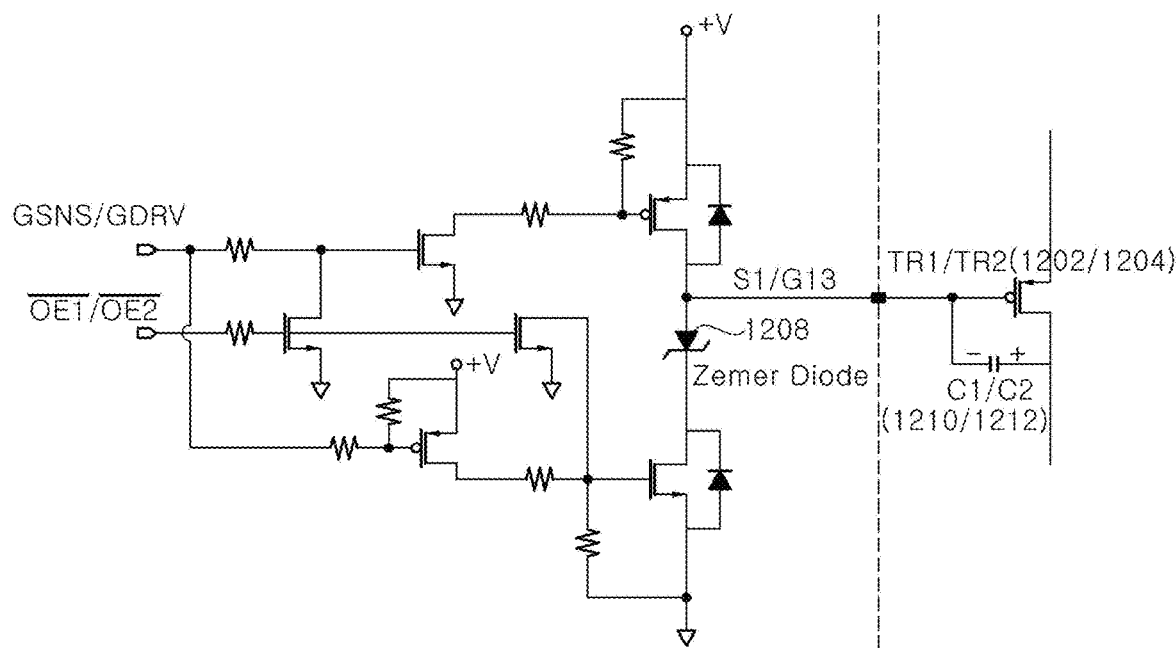
FIG. 12 is a circuit diagram of a Tri-State buffer (TSB) of a1 of FIG. 11, and a truth table representing a relationship between the input and the output of the corresponding circuit.

FIG. 12 is a circuit diagram of a Tri-State buffer (TSB) 1206 of a1 of FIG. 11, and a truth table representing a relationship between the input and the output of the corresponding circuit.

The ports S1 and G13 of the touch drive IC are connected to the outputs of the tri-state buffers (TSB1 and TSB2) 1132 and 1134, and are the tri-state buffers having three different outputs of output high, output low, and high impedance Hi-z as the output.

The outputs of the tri-state buffer TSB1 and the tri-state buffer TSB2 are connected to the input ports S1 and G13 of the touch drive IC 1130 of FIG. 11, respectively, and the circuit configuration of each buffer is the same.

FIG. 12 is an electronic circuit diagram and an operation truth table of the tri-state buffer TSB1 of FIG. 11.

When an output enable ($\overline{OE1}$, $\overline{OE2}$) is low, an output that is the same as the input is obtained, and when the output enable ($\overline{OE1}$, $\overline{OE2}$) is high, the output is in a high impedance (Hi-z) state regardless of the input level.

A Zener diode 1208 in an output terminal of a1 of FIG. 12 is for charging and reversely charging the capacitors (C1 and C2) 1210 and 1212 while protecting the elements from electric shock, such as static electricity.

A break down voltage of the Zener diode may be selected in proportion to the sensing voltage applied to the sensor switch.

Figure 13:
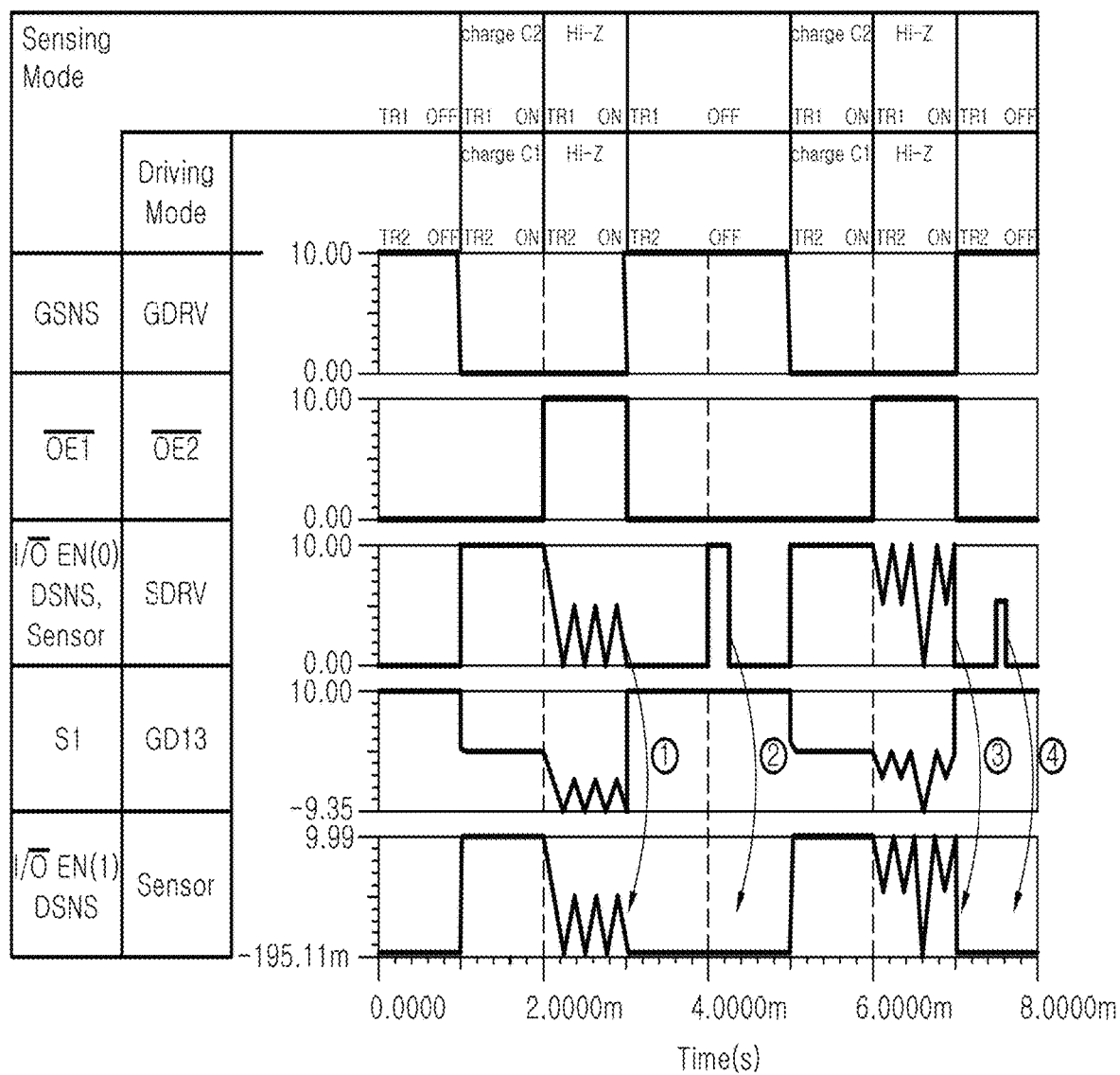
FIG. 13 is a timing diagram of an output signal according to an sensing mode and a driving mode after an input signal is input to the electronic circuit of FIGS. 11 and 12.

FIG. 13 is a timing diagram of an output signal according to an sensing mode and a driving mode after an input signal is input to the electronic circuit of FIGS. 11 and 12.

In the order of the sensing operation in the sensing mode, as illustrated in a2 of FIG. 11, the capacitor C1 is charged by outputting $\overline{OE1}$ (0, Low) & GSNS(0, Low) to the port S1 and outputting I/$\overline{OEN}$ (0, Low) & DSNS(1, High) to the port P11, and then in case of $\overline{OE1}$(1, High) & I/$\overline{OEN}$ (1, High), the port S1 of the tri-state buffer 1 TSB1 is high impedance (Hi-z), so that the transistor TR1 is turned on, and the voltage Vsens applied to the sensor (see reference numeral 1110 of FIG. 1) is output to the DSNS via the port P11 of the touch drive IC TDI like ① and ③ of FIG. 13.

When the foregoing sensing operation order is repeated, it is possible to implement a continuous sensing mode.

In order to block the sensing mode, when I/$\overline{OEN}$ (0, Low) & DSNS(0, Low) is output to the port P11 and $\overline{OE1}$(0, Low) & GSNS(1, High) is output to the port S1, the capacitor C1 is reversely charged and the transistor TR1 is turned off, and the signal of the sensor (see reference numeral 1110 of FIG. 11) fails to pass through the transistor TR1 and fails to reach the port P11 of the touch drive IC TDI and the DNS like ② and ④ of FIG. 13.

In the driving operation order in the driving mode, as illustrated in a2 of FIG. 11, when the capacitor C2 is charged by outputting $\overline{OE2}$(0, Low) & GDRV(0, Low) to the port G13, and outputting SDRV(+V) to the port GD1 and then in case of $\overline{OE2}$(1, High), the port G13 of the tri-state buffer 2 (TSB2) is high impedance (Hi-z), so that the transistor TR2 is turned on and the voltage Vdrv applied to the SDRV reaches the sensor via the port GD1 of the touch drive IC TDI and the transistor TR2 like ① and ③ of FIG. 13.

When the foregoing driving operation order is repeated, it is possible to implement a continuous driving mode.

In order to block the driving mode, when SDRV(0, Low) is output to the port GD1 and $\overline{OE2}$(0, Low) & GDRV(1, High) are output to the port G13, the capacitor C2 is reversely charged and the transistor TR2 is turned off, and the SDRV of the touch drive IC (TDI) and the signal of the GD1 fails to pass through the transistor TR2 to fail to reach the sensor (see reference numeral 1110 of FIG. 11) like ② and ④ of FIG. 13.

As described above, the driving & sensing voltages (0 V to +V) applied to the sources of the transistors TR1 and TR2 may be transmitted to the sensor or the TDI input port P11 even without applying the negative voltage (−V) to the gates of the transistors TR1 and TR2 in the sensing & driving modes.

Like the exemplary embodiment of the present invention, the voltage range of the driving voltage of the touch drive IC TDI is decreased even while the sensor switch is formed of only with the plurality of P-type transistors, thereby decreasing power consumption and decreasing a chip size.

Each of the exemplary embodiments of the present invention described above may be implemented individually, or may be combined with each other and implemented in combination. The present invention described above is not limited by the foregoing exemplary embodiment and the accompanying drawings, and may be variously substituted, transformed, and changed within the scope without departing from the technical spirit of the present invention. This will be apparent to those skilled in the art.

What is claimed is:

1. A touch screen, comprising:
    a plurality of touch sensors which are maintainable in a sensing state and a driving state;
    a plurality of sensor switches, each of which independently controls a state of a corresponding one of the plurality of touch sensors and includes a first P-type transistor, a first capacitor, a second P-type transistor, and a second capacitor wherein the first capacitor connects a gate and a source of the first P-type transistor and the second capacitor connects a gate and a source of the second P-type transistor;
    a plurality of multiplexers (MUXs) which group the plurality of touch sensors into a plurality of groups and divide each of the plurality of groups into a plurality of blocks to control the plurality of touch sensors in a unit of a block; and a touch drive IC which detects a touch based on touch capacitance generated by at least one or more touch sensors in the sensing state, or provides a voltage applied to the plurality of touch sensors in the driving state.

2. The touch screen of claim 1, wherein the voltage applied to the plurality of touch sensors is simply a positive voltage, and the positive voltage includes zero voltage.

3. The touch screen of claim 1, wherein in the sensing state, the first capacitor is charged, the first P-type transistor is turned on, and a voltage of the touch capacitance is output to the touch drive IC through the MUX, and in the driving state, the second capacitor is charged, the second P-type transistor is turned on, and a predetermined DC voltage or a ground (GND) voltage is applied to the touch sensor from the touch drive IC.

4. The touch screen of claim 1, wherein the touch drive IC includes two tri-state buffers for controlling turn on or turn off of the first P-type transistor or the second P-type transistor, and charge and reverse charge of the first capacitor or the second capacitor.

5. The touch screen of claim 4, wherein an output of each of the two tri-state buffers is any one of a HIGH/LOW DC voltage and a Hi-z (Tri-state) voltage.

6. The touch screen of claim 4, wherein each of the two tri-state buffers includes a Zener diode to prevent electric shock of the tri-state buffer and to control charge and reverse charge of the first capacitor and the second capacitor.

7. The touch screen of claim 6, wherein a break down voltage of the Zener diode is determined in proportion to a voltage applied to the sensor switch.

8. The touch screen of claim 1, wherein the driving state is divided into two or more sub states according to the voltage applied from the touch drive IC to the touch sensor, and the voltage applied to the touch sensor in the driving state is a voltage programmable by the touch drive IC.

9. The touch screen of claim 8, wherein in each of the two or more sub states, the voltage applied to the touch sensor is different and is any one of a HIGH/LOW DC voltage and a Hi-z (Tri-state) voltage.

10. The touch screen of claim 1, wherein control signals of the sensor switch and the MUX are generated from the touch drive IC, and a driving voltage of the sensor switch is a DC voltage between a high level (+V) and a low level (+0 V).

11. The touch screen of claim 1, wherein the number of groups corresponds to the number of MUXs, and the number of blocks in each group corresponds to the number of input ports of each MUX.

12. The touch screen of claim 1, wherein the plurality of sensor switches and the plurality of MUXs are disposed on a touch screen panel on which the plurality of touch sensors are arranged.

13. The touch screen of claim 1, wherein each of the plurality of sensor switches includes a first port for connecting a touch sensor connected to the sensor switch to the MUX, and a second port for applying a voltage in the driving state.

14. The touch screen of claim 1, wherein the touch drive IC interlocks a switch control signal for controlling the plurality of sensor switches and a MUX control signal for controlling the plurality of MUXs to perform a touch detection scanning operation in the unit of the block.

15. The touch screen of claim 14, wherein the MUX control signal is identically applied to each MUX, and the switch control signal is identically applied to each block.

16. The touch screen of claim 14, wherein the touch drive IC applies different switch control signals to sensor switches in each block while performing the touch detection scanning operation in the unit of the block.

* * * * *